Figure 1:
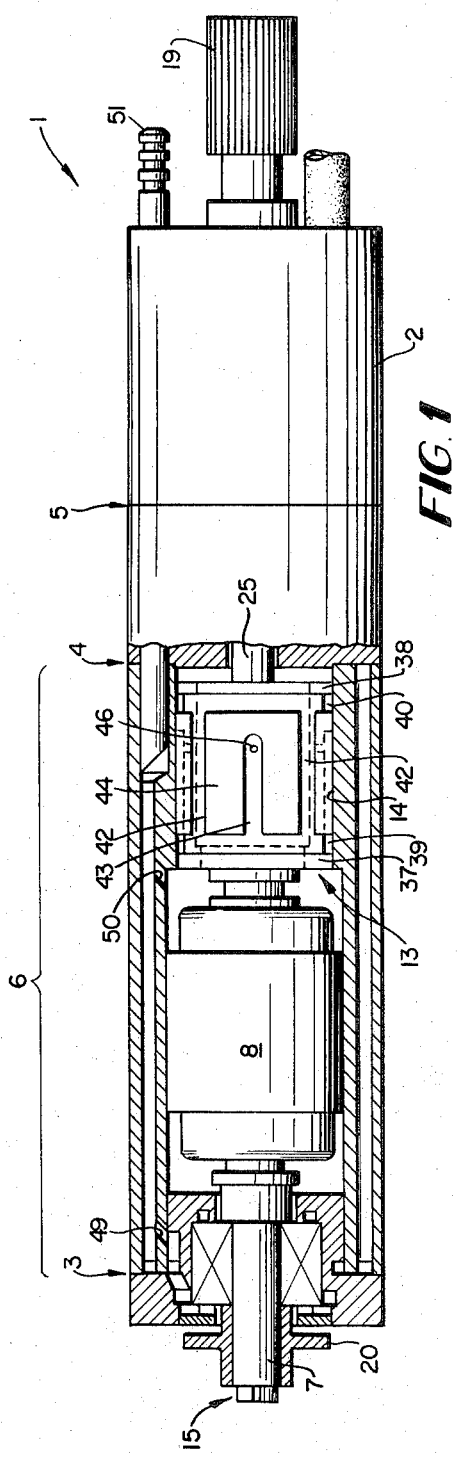

United States Patent [19]

Nattefort

[11] 3,781,072

[45] Dec. 25, 1973

[54] BEARING ARRANGEMENT

[75] Inventor: Fritz Nattefort, Leichlingen, Germany

[73] Assignee: Rockwell International Corporation, Pittsburgh, Pa.

[22] Filed: Mar. 2, 1972

[21] Appl. No.: 231,108

[30] Foreign Application Priority Data
Mar. 5, 1971 Germany.................. P 21 10 663.8

[52] U.S. Cl. ............................. 308/15, 308/189 R
[51] Int. Cl. ............................................ F16c 35/12
[58] Field of Search .................... 308/15, 26, 9, 58, 308/59, 176, 184, 189, 122, 236

[56] References Cited
UNITED STATES PATENTS
3,214,224 10/1965 Lash ................................... 308/176
2,683,228 7/1954 Schaefer .............................. 308/59
3,305,280 2/1967 Peterson ............................. 308/122
3,332,726 7/1967 Cooper ................................... 308/9
3,385,641 5/1968 Foglia ................................. 308/122
3,394,971 7/1968 Bazeley ................................... 308/9

Primary Examiner—Charles J. Myhre
Assistant Examiner—Barry Grossman
Attorney—William A. Strauch et al.

[57] ABSTRACT

Bearing arrangements for high speed rotating shafts which are capable of accommodating thermal expansion and thereby minimizing changes in the initial loading on the bearings and which are constructed so that the initial loading can be adjusted to a selected magnitude.

16 Claims, 2 Drawing Figures

PATENTED DEC 25 1973

3,781,072

BEARING ARRANGEMENT

This invention relates to a bearing arrangement for high speed rotating shafts which must therefore be precisely adjusted axially of the shaft, but which are subject to conditions that cause changes in the distance between the bearings.

The problem with which the invention originated occurs with grinding spindles. Grinding spindles are chiefly supplementary apparatus used, e.g., for delicate internal grinding operations. They are attached by appropriate jigs to boring mills and milling tools having comparable precision. They have a rigid steel housing which the jig engages and by which they are guided during the machining process.

Inside of the housing is the actual spindle, which is driven by a high-frequency electric motor at idling speeds in excess of 100,000 rpm. The spindle is supported by ball bearings, which are provided at both ends of the motor armature. Ball bearings for these applications have to endure extraordinarily high rotational speeds for extended periods while staying in precise adjustment, a criteria which places very high emphasis on the correct initial loading of the bearings.

The difficulty is that, because the unavoidable heating of the motor during operation, the spindle is also heated and expands longitudinally between the bearings; and the initial adjustment is lost because of the shaft elongation. In the conventional rigidly installed bearings this produces an increase or a decrease in the initial stress on the bearings, which can lead to a destruction of the bearings, or to a loss of precision in the operation of the tool.

It is the object of the invention to provide bearing arrangements of the just mentioned type, which do not experience a detrimental variation in the initial stress on the bearings when the distance between the bearings changes because of shaft elongation.

In the invention, at least one of the bearings is rigidly affixed in a guide bushing which is supported in the housing and is elastically longitudinally displaceable with the shaft. The guide bushing can shift to compensate for elongation of the shaft section between the bearings without significantly varying the forces exerted by the shaft upon the bearings as determined by the initial adjustment of the bearings. By housing the bearing in the guide bushing the bearing is isolated from all forces due to the displacement of the bushing; furthermore, a surface with relatively large supporting clearance is created, assuring precise guidance of the bearing despite its movable installation.

Both bearings may be installed in such a guide bushing. Normally, however, one bearing is rigidly installed to fix the shaft in the longitudinal direction, and only the other bearing is installed in a guide bushing, as in the grinding spindle with which the invention originated.

The invention can be used in conjunction with any type of bearings in which the forces applied longitudinally of a shaft influence their adjustment. It is useful chiefly with ball bearings, which are able to cope best with high rotational speeds, but which require that longitudinal forces be taken into account.

In the preferred form of the invention the guide bushing has a cylindrical outer surface, is outside of and coaxial with the shaft, and is mounted in a correspondingly configured bore in the housing.

To provide elastic displaceability one can advantageously employ a spring to bias the guide bushing in a direction along the axis of the shaft. In the preferred construction the spring exerts a force which subjects the shaft to a tensile stress between the bearings. The inverse application of force is also possible if the bearing arrangement is appropriately constructed.

An abutment beyond which an extension connected to the guide bushing extends can be provided in the housing outside the bearings. Another abutment is fixed to the extension, and the spring is installed between the abutments to produce the requisite pressure.

The abutment can be a partition in the housing with the extension being located along the axis of the housing and extendint through a central bore in the partition. The abutment fixed to the extension can be a disk threaded onto it.

This produces a central application of the spring produced biasing force, allowing the desired initial stress on the bearings to be regulated simply by threading the disk to the appropriate depth on the extension.

The bearing is fixed within the guide bushing by a retaining ring fitted into the guide bushing. The bearing is clamped to the retainer ring which rests against an internal shoulder. The other side of the ring is engaged by a pressure plate supported by the guide bushing.

The pressure plate can be cylindrical and can carry the extension on the side thereof opposite the bearing. It can be biased against the bearing retaining ring by a bowed spring fixed to the inside wall of the guide bushing and encircling the extension to provide a firm contact between the retaining ring and the shoulder in the guide bushing. The elasticity constant of the bowed spring is considerably higher than that of the spring which produces the elastic displacement. The latter spring is designed to produce the desired initial stress on the bearings and is also so designed that longitudinal displacement of the guide bushing will produce only insignificant variations of the force exerted on and therefore inconsequential variations in the initial adjustment of the bearings.

Another important characteristic of the invention is that the guide bushing is supported in the housing on a fluid film. This allows free movement but, at the same time, reliable guidance of the spindle. The film creates a connection between the housing and the guide bushing which, because it is of a viscous fluid, is not dislodged despite the narrowness and length of the gap between the guide bushing and the housing.

Measurements determined that there were not even displacements as small as 1 My resulting from the transverse forces in play. This support on the fluid film therefore considerably increases the precision of the bearings.

It is recommended that the fluid be the lubricant provided for the bearings. Then only one fluid has to be conveyed through the bearing arrangement, as it is in the preferred form of the grinding spindle, in which an oil mist lubricates the bearings and also provides the supporting film for the guide bushing.

To conduct the film forming lubricant in the desired manner, the guide bushing can have a system of recessed external channels communicating with feed channels emerging from the inside wall of the housing. For flow into the inside of the guide bushing, there are openings which lead from the external channels to the inside of the guide bushing; also the pressure plate can be provided with passages which communicate between the openings and the bearing when the pressure plate is fitted in position.

To limit the formation of the film on the surface of the guide bushing and to keep fluid from leaking out at the ends of the guide bushing, the surface of the guide bushing in which the channels are formed preferably has outwardly directed portions at the ends thereof which extend around the periphery and between which the channels formed.

The channels include circumferential channels extending around the entire bushing periphery adjacent the end portions of the bushing. These can be connected by longitudinal channels.

For practical purposes there are also longitudinal channels which communicate with one of the circumferential channels but which do not reach the other circumferential channel.

The openings to the interior of the bushing are preferably provided at the ends of the last-mentioned longitudinal channels. This assures that the film forming lubricant will not flow directly and without building up a sufficient supporting film through the openings into the inside of the guide bushing, but that it will do this only after traversing a relatively long labyrinthine flow path in the course of which it will penetrate between the guide bushing and the housing and build up the film.

Figure 2:
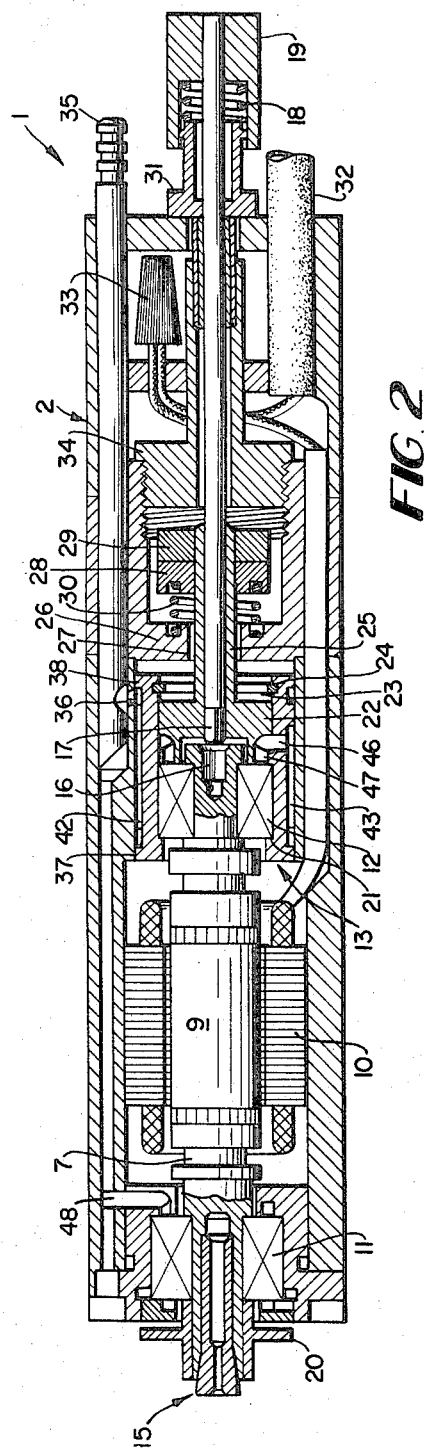

A representative embodiment of the invention is the grinding spindle illustrated in the drawing in which:

FIG. 1 is a side view of a grinding spindle with the housing partially in longitudinal section; and FIG. 2 is a longitudinal section through the grinding spindle of FIG. 1 taken along a different plane.

The grinding spindle identified as 1 in FIGS. 1 and 2 comprises a housing 2 which has cylindrical outer and inner surfaces and is divided into sections terminating at planes 3, 4 and 5 which are vertical to the longitudinal housing axis. The actual spindle forming shaft 7, which is driven by a high-frequency electric motor 8, rotates in the housing section 6 located between planes 3 and 4. Motor 8 includes an armature 9 fixed on the shaft and a stator 10 mounted in housing 2.

Shaft 7 is supported in bearings 11 and 12 located on opposite sides of armature 9. Bearing 11 is rigidly fixed in housing 2, and bearing 12 is positioned in a guide bushing 13 which is longitudinally displaceable in the cylindrical inner bore of housing 2 for reasons that will be explained in detail later. Bearings 11 and 12 are precision, heavy duty, ball bearings.

Shaft 7, which constitutes the grinding spindle proper in the illustrated embodiment of the invention, has a collet mechanism 15 for grinding tools on its output end. At the other end of the shaft is an internal polygonal seat 16. A corresponding polygonal bar 17 can be advanced when necessary by compressing spring 18 by means of handle 19 to engage it in seat 16. This couples shaft 7 to handle 19 so that, by rotating handle 19 relative to and in the opposite direction from adjusting sleeve 20, collet mechanism 15 can be tightened and loosened. Upon release of handle 19, spring 18 biases polygonal bar 17 out of contact with shaft 7 so that the latter can rotate freely.

Bearing 12 is clamped to a retainer ring (not shown in detail) and the assembly disposed in guide bushing 13 between shoulder 21 and a pressure plate 22. A bowed plate spring 23, which is supported by a Seeger ring 24 positioned in an inner groove in guide bushing 13, presses against pressure plate 22. Pressure plate 22 has an extension 25 which extends through plate spring 23 and through a central aperture 27 in a partition 26 in housing 2. A disk 28, which can be fastened to extension 25 by a lock disk 29, is screwed onto the end of the extension in overlapping spindle forming shaft 7, which is driven by a high-frequency electric motor 8, rotates in the housing section 6 located between planes 3 and 4. Motor 8 includes an armature 9 fixed on the shaft and a stator 10 mounted in housing 2.

Shaft 7 is supported in bearings 11 and 12 located on opposite sides of armature 9. Bearing 11 is rigidly fixed in housing 2, and bearing 12 is positioned in a guide bushing 13 which is longitudinally displaceable in the cylindrical inner bore of housing 2 for reasons that will be explained in detail later. Bearings 11 and 12 are precision, heavy duty, ball bearings.

Shaft 7, which constitutes the grinding spindle proper in the illustrated embodiment of the invention, has a collet mechanism 15 for grinding tools on its output end. At the other end of the shaft is an internal polygonal seat 16. A corresponding polygonal bar 17 can be advanced when necessary by compressing spring 18 by means of handle 19 to engage it in seat 16. This couples shaft 7 to handle 19 so that, by rotating handle 19 relative to and in the opposite direction from adjusting sleeve 20, collet mechanism 15 can be tightened and loosened. Upon release of handle 19, spring 18 biases polygonal bar 17 out of contact with shaft 7 so that the latter can rotate freely.

Bearing 12 is clamped to a retainer ring (not shown in detail) and the assembly disposed in guide bushing 13 between shoulder 21 and a pressure plate 22. A bowed plate spring 23, which is supported by a Seeger ring 24 positioned in an inner groove in guide bushing 13, presses against pressure plate 22. Pressure plate 22 has an extension 25 which extends through plate spring 23 and through a central aperture 27 in a partition 26 in housing 2. A disk 28, which can be fastened to extension 25 by a lock disk 29, is screwed onto the end of the extension in overlapping relationship to partition 26. Disk 28 and partition 26 form abutments for compression spring 30 which biases the guide bushing 13 and bearing 12 carried by extension 25 away from bearing 11. The force exerted by spring 30 can be varied to impart the desired initial bias on bearings 11 and 12 by the distance disk 28 is screwed onto extension 25.

To gain access to disks 28 and 29, threaded member 31 is unscrewed and removed, the section of housing 2 to the right of plane 5 is removed, electrical conductor 32 is disconnected at 33, and threaded member 34 is removed.

Bearings 11 and 12 are lubricated by an oil mist supplied through feed line 35. Feed line 35 opens into a feed channel 36 which, in turn, communicates with the external surface of guide bushing 13. Guide bushing 13 has channels on this surface between the cylindrical portions 37 and 38 at the ends of guide bushing 13. The channel arrangement includes circumferential channels 39 and 40 adjacent bushing end portions 37 and 38. Circumferential channels 39 and 40 are connected by longitudinal channels 42. Further, there are intermediate longitudinal channels 43 which originate at circumferential channel 39 but which do not extend to circumferential channel 40. Thus, the cylindrical surface portions of guide bushing 13 are end portions 37 and 38 and the U-shaped areas 44 between the longitudinal channels.

At the ends of intermediate longitudinal channels 43 are passages 46 which open into passages 47 through pressure plate 22. These passages are directed toward bearing 12.

Thus the oil mist enters bearing 12 through feed line 35; feed channel 36; channels 39, 40, 42, and 43; openings 46; and passages 47. The oil mist flowing through the channels of guide bushing 13 forms an oil film on its cylindrical areas 37, 38, and 44 which supports guide bushing 13 from the inside wall 14 of housing 2. This results in a free-of-play fit of the guide bushing 13 and bearing 12 in housing 2.

As the temperatures of armature 9 and the corresponding area of shaft 7 increase, guide bushing 13 can move longitudinally in housing 2 without a noticeable variation in the initial stress imparted by the spring 30 to the bearings, because the small longitudinal expansion of shaft 7 causes only a slight expansion of spring 30 and a correspondingly small variation in the force exerted by the spring.

Feed line 35 also communicates through feed line 48 with rigid bearing 11 to supply it with oil mist. The oil mist emerging from bearings 11 and 12 is exhausted through suction channels 49 and 50, which communicate with drain line 51 as shown in FIG. 1.

The invention can also be applied in other cases presenting the same problems as the grinding spindle; i.e., in which a shaft subject to longitudinal expansion rotates at high speed in bearings which must be adjusted with precision in the longitudinal direction. Examples of such devices are gyroscopes, centrifuges, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. The combination of a housing; a shaft; and a bearing arrangement for supporting said shaft for high speed rotation in said housing which can be precisely adjusted in the axial direction and which is capable of accommodating longitudinal expansion of said shaft, said bearing arrangement comprising first and second bearings at locations spaced along said shaft, a guide which is movable longitudinally in said housing and has one of said bearings fixed to it for movement therewith, and means for producing a tensile force on the shaft in the portion thereof between said bearings comprising a spring biasing said guide longitudinally of said shaft and away from said bearings.

2. The combination of a housing; a shaft; and a bearing arrangement for supporting said shaft for high speed rotation in said housing which can be precisely adjusted in the axial direction and which is capable of accommodating longitudinal expansion of said shaft, said bearing arrangement comprising bearings at locations spaced along said shaft, a guide which is movable longitudinally in said housing and has one of said bearings fixed to it for movement therewith, a spring biasing said guide longitudinally of said shaft and so disposed as to produce a tensile force on the shaft in the portion thereof between the bearing fixed to the guide and a second bearing rotatably supporting the shaft, and means providing an abutment in said housing beyond said guide supported bearings, said guide having an extension thereof extending past said abutment and there being stop means fixed to said extension to form a second abutment, said spring being disposed between and engaging the abutments.

3. The combination of claim 2, wherein the abutment providing means is a partition in the housing; wherein said extension is coaxial with the rotatably supported shaft; and wherein there is a centrally located aperture in said partition through which said extension extends.

4. The combination of claim 2, wherein said stop means is threadedly fixed to said extension so that the distance between the adjustment means can be altered to vary the biasing force exerted by the spring.

5. The combination of a housing; a shaft; and a bearing arrangement for supporting said shaft for high speed rotation in said housing which can be precisey adjusted in the axial direction and which is capable of accommodating longitudinal expansion of said shaft, said bearing arrangement comprising bearings at locations spaced along said shaft and a guide which is movable longitudinally in said housing, one of said bearings being fixed to said guide for movements therewith, said one bearing being seated in a recess in said guide adjacent an annular shoulder therein, and there being a pressure plate in and supported from said bushing on the opposite side of the bearing-retainer assembly from said shoulder to confine said bearing against said shoulder.

6. The combination of claim 5, together with means in said guide for biasing said pressure plate against said bearing.

7. The combination of a housing; a shaft; a bearing arrangement for supporting said shaft for high speed rotation in said housing which can be precisely adjusted in the axial direction and which is capable of accommodating longitudinal expansion of said shaft, said bearing arrangement comprising bearings at locations spaced along said shaft and a guide which is movable longitudinally in said housing and has one of said bearings fixed to it for movement therewith; and means for so effecting a flow of lubricant through the interior of the housing as to form a supporting film between said housing and said guide.

8. The combination of claim 7, wherein said flow effecting means comprises a system of channels opening onto the exterior of the guide and at least one line for supplying lubricant to said channels.

9. The combination of claim 8, together with means for circulating said lubricant to the bearings of the bearing arrangement.

10. The combination of claim 9, wherein the means for supplying lubricant to the bearings includes at least one passage through said guide, said passage communicating with one of the channels opening onto the exterior surface of the guide.

11. The combination of claim 10, wherein the bearing movable with the guide is seated therein and including a pressure plate in said guide adjacent the bearing, there being a passage through said pressure plate in communication with the passage through the guide.

12. The combination of claim 8, wherein the end portions of the exterior of the guide have an uninterrupted cylindrical configuration and wherein the channels which open onto the exterior of the guide are located entirely between said end portions.

13. The combination of claim 12, wherein said channels include circumferential channels adjacent said end portions which completely encircle said guide.

14. The combination of claim 13, wherein there are longitudinal channels extending between and communicating with said circumferential channels.

15. The combination of claim 13, wherein there are longitudinal channels which communicate at one end thereof with a circumferential channel, said channels each extending toward but terminating short of the other circumferential channel.

16. The combination of claim 15, together with openings through said guide at the blind ends of said longitudinal channels through which lubricant can flow to the bearing associated with said bushing.

* * * * *

PO-1050
(5/69)

UNITED STATES PATENT OFFICE
CERTIFICATE OF CORRECTION

Patent No. 3,781,072     Dated December 25, 1973

Inventor(s) Fritz Nattefort

It is certified that error appears in the above-identified patent and that said Letters Patent are hereby corrected as shown below:

Column 4, Line 6, following the word "overlapping" delete contents to Line 42 before the word "relationship".

Signed and sealed this 14th day of January 1975.

(SEAL)
Attest:

McCOY M. GIBSON JR.
Attesting Officer

C. MARSHALL DANN
Commissioner of Patents